(12) United States Patent
Adams

(10) Patent No.: US 8,978,830 B2
(45) Date of Patent: Mar. 17, 2015

(54) LIFTING APPARATUS

(76) Inventor: William Mark Adams, Retford (GB)

( * ) Notice: Subject to any disclaimer, the term of this patent is extended or adjusted under 35 U.S.C. 154(b) by 612 days.

(21) Appl. No.: 12/768,140

(22) Filed: Apr. 27, 2010

(65) Prior Publication Data

US 2010/0276231 A1   Nov. 4, 2010

(30) Foreign Application Priority Data

Apr. 29, 2009  (GB) .................................. 0907333.9

(51) Int. Cl.
*B66B 9/16* (2006.01)
*B65G 65/00* (2006.01)
*B65G 69/24* (2006.01)

(52) U.S. Cl.
CPC ..................................... *B65G 69/24* (2013.01)
USPC ............................ 187/242; 414/391; 414/281

(58) Field of Classification Search
CPC .......... B61D 47/005; B66F 9/02; B65G 1/04; B66B 11/008
USPC ................. 187/272, 252, 274, 313, 250, 414; 414/391, 392, 399, 281
See application file for complete search history.

(56) References Cited

U.S. PATENT DOCUMENTS

| | | | | |
|---|---|---|---|---|
| 2,066,221 A * | 12/1936 | Payne | ............................ | 182/101 |
| 3,172,501 A * | 3/1965 | Ramer | ............................ | 187/244 |
| 3,263,832 A * | 8/1966 | Williams, Jr. et al. | ........ | 414/344 |
| 3,343,692 A * | 9/1967 | Arnot | ............................ | 414/281 |
| 3,485,389 A * | 12/1969 | Armington et al. | ........... | 414/282 |
| 3,627,079 A * | 12/1971 | Nielsen et al. | ................ | 187/406 |
| 3,734,311 A * | 5/1973 | Thompson et al. | ........... | 414/273 |
| 3,749,201 A * | 7/1973 | Clarke | ........................... | 187/243 |
| 3,908,801 A * | 9/1975 | Pohlman | ....................... | 187/313 |
| 3,991,857 A * | 11/1976 | Wolk et al. | ..................... | 187/269 |
| 4,063,619 A * | 12/1977 | Drews | ............................ | 187/274 |
| 4,312,619 A * | 1/1982 | Anderson et al. | ............. | 414/347 |
| 4,408,739 A * | 10/1983 | Buchsel | ..................... | 244/137.1 |
| 4,557,353 A * | 12/1985 | Pichon | .......................... | 187/239 |
| 4,614,251 A * | 9/1986 | Hawkins | ...................... | 182/69.5 |
| 4,664,230 A * | 5/1987 | Olsen | ............................ | 187/255 |
| 5,018,926 A * | 5/1991 | Sternad | ......................... | 414/253 |
| 5,082,415 A * | 1/1992 | Hayashi | ........................ | 414/343 |
| 5,487,636 A * | 1/1996 | Mkrtchyan | ................... | 414/286 |
| 6,105,728 A * | 8/2000 | Combs, Jr. | ..................... | 187/372 |
| 6,182,798 B1 * | 2/2001 | Brady et al. | .................. | 187/282 |
| 2012/0183377 A1 * | 7/2012 | Toguri | .......................... | 414/281 |

FOREIGN PATENT DOCUMENTS

EP        1777246 A1 *  4/2007  ............ B65G 69/24

* cited by examiner

*Primary Examiner* — William E Dondero
*Assistant Examiner* — Minh Truong
(74) *Attorney, Agent, or Firm* — Woodard, Emhardt, Moriarty, McNett & Henry LLP

(57) ABSTRACT

The invention relates to a lifting apparatus of a type which can be used to allow movement of goods to and from and between first and second goods storage areas. The apparatus is located in a space between openings into both of said storage areas and includes a platform which can be raised in the vertical plane so as to allow differences in height between floors of the respective goods storage areas to be taken into account such that for example goods can be moved onto the platform of the lifting apparatus from a first floor height on a first goods storage area to a floor of a second goods storage area at a different height. The lifting apparatus can be used to move goods to and from a floor of a goods storage area which is at the similar height to a support surface on which the other of the goods storage areas is located, with the other of the goods storage areas typically being a vehicle trailer.

12 Claims, 11 Drawing Sheets

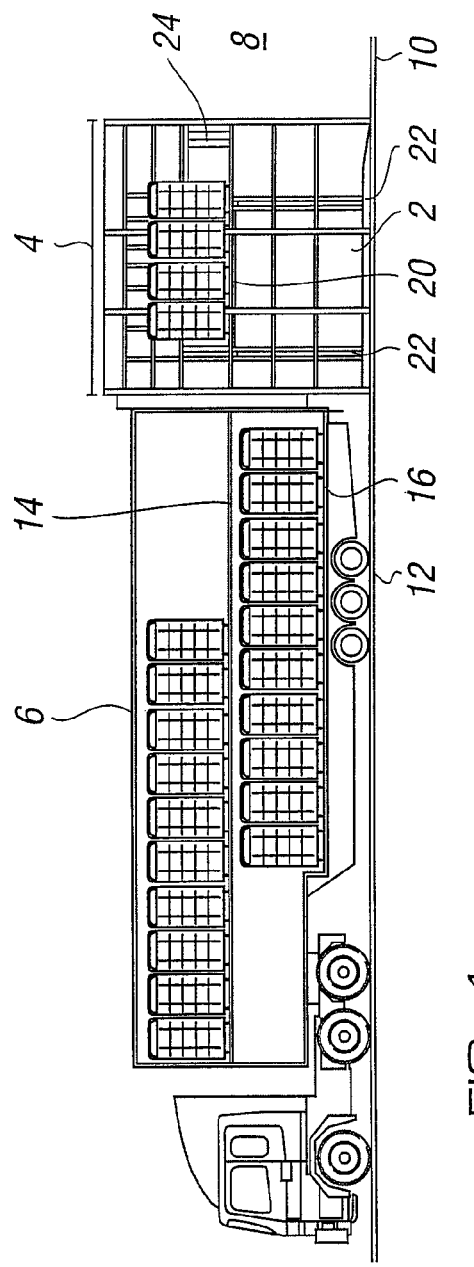
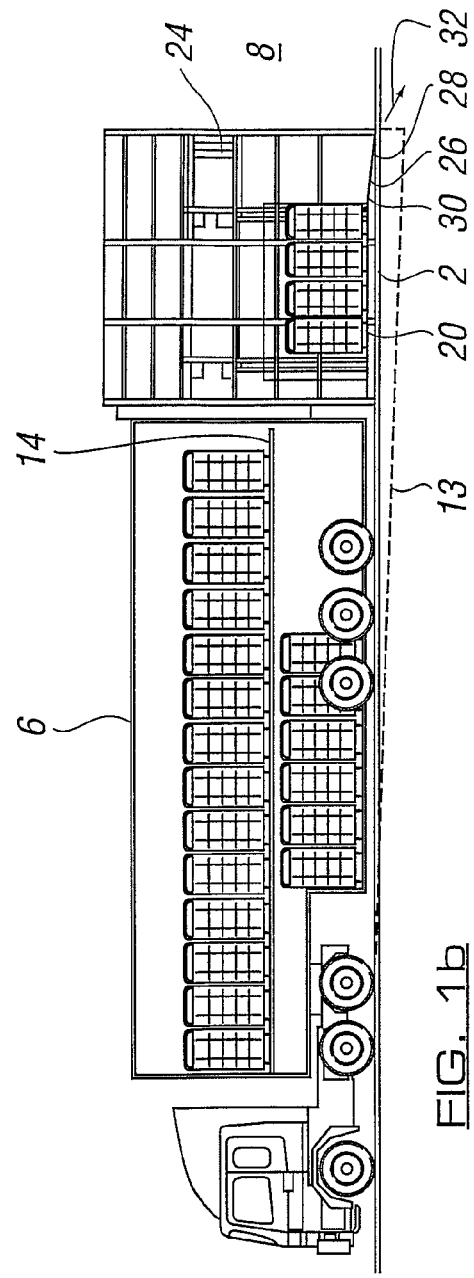

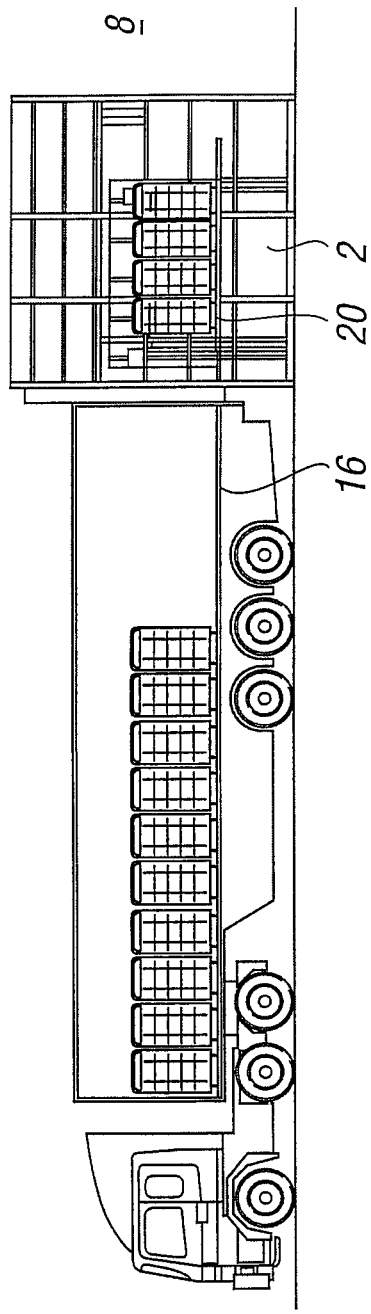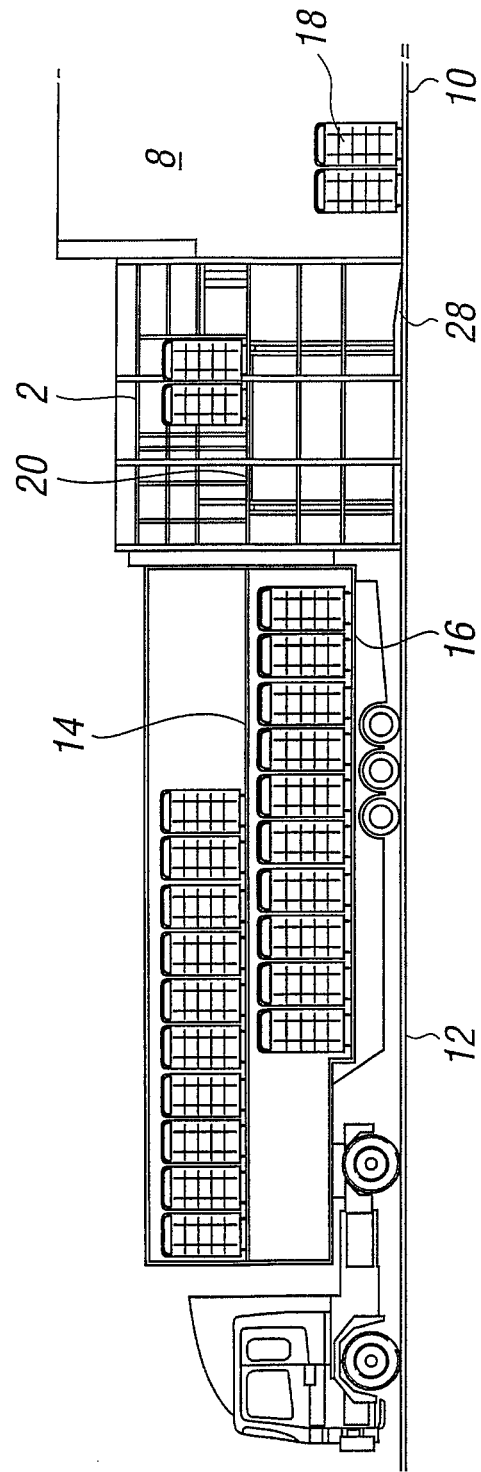

LIFTING APPARATUS

The invention to which this application relates is apparatus which can be used for lifting goods between different levels, particularly, although not necessarily exclusively, apparatus for use in the transfer of goods between first and second goods storage areas such as, for example, a first goods storage area in the form of a warehouse and a second goods storage area in the form of a vehicle trailer with two or more spaced floors thereon.

Typically, when providing apparatus to allow the moving of goods between vehicle trailers having one, or a plurality, of floors, referred to as multi-deck or double deck trailers, there is normally a need to perform civil engineering works including excavation into the ground or support surface either with regard to a loading deck installed at the opening into a goods warehouse and up to which deck, the rear of the vehicle trailer is moved and opened or, if there is no loading deck, to allow the level of the floor of the vehicle storage area to lie in line with the floor of the warehouse. The lifting apparatus conventionally will include a scissor lift fixed to a support surface such as a concrete ground base. The scissor lift acts on a platform to move the same vertically. Once the scissor lift has been installed, an external housing can be formed around the same to protect it from the weather. The construction time for this type of apparatus can be lengthy and expensive and be several days or weeks.

The inventor has identified this problem and their co-pending application no EP1775246 sets out details of a modular platform unit which can be manufactured under factory conditions and then assembled on site relatively quickly thereby minimising construction time and the excavation work which is required.

The modular units set out in the previous application typically comprise a body unit to which the platform, guide means and drive means are all fitted in position in the factory and transported as modular units for assembly on site. The need to provide drive means and guide means and the platform all as part of the body unit module means that at the factory there is required to be available a relatively wide range of technical expertise. For example, the drive means are typically provided in the form of one or more hydraulic rams which require a different expertise to that required to fabricate the body unit frame, guide means and platform. This requirement for different personnel expertises can lead to downtime and delays in the manufacture of the modular units.

With regard to the need to excavate the site for conventional lifting apparatus the problems experienced include the time needed for the excavation to be performed, and also, especially when a downward ramp is required to be dug into the ground in order to bring the floor of the opening of the vehicle goods storage area in line with the floor of the warehouse, the provision of the ramp means that a significant area of the loading yard is unusable for any other purpose. This can be a significant problem in yards where space is normally confined.

A first aim of the invention is to provide apparatus which avoids the need for excavation work to be performed to form a downward ramp.

A second aim of the present invention is to provide lifting apparatus which can be assembled from modular, factory formed, units at the location of use and to provide a means whereby the manufacture of the units can be simplified and improved.

In a first aspect of the invention there is provided a lifting apparatus for use to move goods between first and second, spaced apart, goods storage areas, said apparatus provided to bridge the space between said first and second goods storage areas, said lifting apparatus including a platform to allow goods thereon to be moved, if required, to different height levels, with a first height level being a storage floor of a first goods storage area and a second height level, typically differing from the first, being a storage floor of the second goods storage area wherein there is provided a gap between one end of the platform and the end of the apparatus which lies adjacent the second goods storage area, said apparatus including in said gap a portion which, at least adjacent the second goods storage area, is at a height substantially in line with the floor of the second goods storage area.

Typically, the said gap portion is in the form of a ramp, with the height of the ramp being greatest adjacent to the end of the platform and the height of the ramp being at its lowest adjacent to the second goods storage area.

In one embodiment the height level of the floor of the second goods storage area is at substantially the same level as the ground or support surface on which the first goods storage area is located. Typically the first goods storage area is a movable or transportable goods storage area such as a vehicle trailer.

Typically, the height of the second goods storage area floor is lower than the height of the lowest floor of the first goods storage area.

Typically, the highest point of the said gap portion is such that the same matches and marries with the height of the top surface of the platform in at least one position of the platform.

In one embodiment, the said at least one position of the platform is that in which it is fully lowered.

In one embodiment, the first goods storage area includes a single floor on which goods can be located. In an alternative embodiment the first goods storage area includes a plurality of vertically spaced apart floors each of which is capable of locating goods thereon.

In one embodiment, the platform is vertically movable so as to be positioned at the height of any of the floors of the first goods storage area so as to allow goods to be moved to and from said platform.

In one embodiment, the apparatus includes a drive means for movement of the platform and said drive means are located on a frame of the apparatus and which frame surrounds the platform and typically, at a location which is above the height of the floor of the second goods storage area.

In one embodiment, the frame includes at least one ladder which depends at least partially along the height of the frame so as to allow access to and from the platform even when the platform is at a raised height.

In one embodiment, the drive means is located at or adjacent to the end of the apparatus frame which lies adjacent to the second goods storage area and the ladder is located intermediate the drive means and the end of the platform, at that end of the frame.

If required, the frame of the apparatus can be clad and/or a roof provided over the same, so as to protect the platform from inclement weather conditions.

In one embodiment, the drive means is a hydraulic ram, preferably a single hydraulic ram, which acts upon a plurality of guide means, each of said guide means located, at their opposing end to the platform. Typically, the guide means are located along spaced vertical pillars which are provided as part of the frame, with the guide means being provided along each of the pillars and then connected to the platform, at spaced locations thereon. In one embodiment, the apparatus is provided with four guide means which are located at or adjacent to respective corners of the platform.

In one embodiment, the platform includes a walkway at one side thereof, said walkway separated from the remainder of the platform such that even when the platform has goods located thereon, the personnel on the platform still have the ability to walk from one end of the platform to the other along said walkway.

In one embodiment, at least one of the ends of the platform, there are provided gates which can be moved between a closed position in which access from that end of the platform is not possible and an open position in which access is possible from the platform.

Typically, the apparatus includes a safety mechanism for said gates which prevents the gates from being opened other than when the platform is at a lowered position. This therefore prevents the possibility of personnel walking off the end of the platform when the platform is at a raised level.

In one embodiment, the safety mechanism comprises a fixed member, provided as part of the frame which is located at a height such that when the platform is raised above the lowered level, any attempt to open the gates causes the same to contact with the fixed member which prevents the gates from being opened.

In one embodiment, the apparatus is provided with a plurality of sensing means for various components of the same, said sensing means positioned to detect the correct location of a component of the lifting apparatus. Typically, the sensors are connected to a visual display panel and will only indicate a correct operation of that component, when the correct location of the same is detected.

In one embodiment, the platform includes, at least one end thereof, a bridge portion, said bridge portion provided to be extendable into the open end of the first goods storage area so as to bridge any gap between the adjacent edge of the platform and the end of the floor or floors of the goods storage area.

Typically, the width of the opening into the first goods storage area is narrower than the width of the interior of the goods storage area and the bridge portion is provided such that the same has the ability to fan outwardly once the same has been introduced into the first goods storage area so as to extend across the width of the interior of the goods storage area and thereby allow the goods to be spaced across the width. Typically the bridge is formed by a series of pivotal planar members which can be moved relative to one another in the same manner as a fan.

In one embodiment, the lifting apparatus is provided to allow the movement of cages or trolleys on which the goods are located.

In one embodiment, said trolleys or cages are provided with wheels to allow the same to be rolled but not all of said wheels are rotatable about their vertical axis of the spindle which locates the same to the cages so that movement of the cage along the surface is only possible in certain directions and orientations. In one embodiment, the width of the platform is provided to be sufficient to allow the orientation of the cages with respect to the platform to be adjusted, by rotation of the same when on the platform. This provision of additional width allows the cages to be moved onto the platform in bulk by using a vehicle such as for example a forklift but, once on the platform, allows the cages to be rotated, typically around 90°, so as to ensure that the cages can then be manually moved off the other end of the platform with the wheels or rollers in the correct orientation to allow movement in that direction.

In a further aspect of the invention, there is provided lifting apparatus for use to move goods between first and second, spaced apart, goods storage areas, said apparatus provided to bridge the space between said first and second goods storage locations, said lifting apparatus including a platform to allow goods thereon to be moved, if required, to the different height levels of the respective storage areas, said apparatus assembled from a plurality of factory formed modular units at the location of use and wherein the modular units include a modular unit in which the drive means for the platform are located.

Typically said modular unit with the drive means is received by the modular unit which includes the platform therein.

In one embodiment the modular unit in which the platform is located is the body module and said module includes a frame which supports the platform and guide means therefor. Typically the frame includes a recess into which the drive means modular unit is fitted at the location for use.

In one embodiment the drive means is a powered ram acting on cables or chains connected to the platform.

Typically, each of the modular units are formed under factory conditions and then transported to the location for use to be assembled together. However, it should be appreciated that in accordance with the invention the different modular units may be formed at different factory locations, with the location selected in accordance to the availability of relevant expertise required for the manufacture of that modular unit to form the same at each respective location. Alternatively the modular units are connected together prior to transport to the location of use.

In one embodiment, a roof modular unit is also formed under factory conditions and transported to site at which the respective modules can be connected together to form the apparatus.

In one embodiment, a plurality of body modular units, drive means modular units and roof modular units can be selectively transported to the location and connected together such as to provide a lifting apparatus in a required configuration for that location of use.

Typically, the first goods storage area is a vehicle transported storage area, such as a vehicle trailer, which can be moved into position at one edge of the lifting apparatus. Typically, the second goods storage area is a warehouse or a loading bay for the same.

Typically, the vehicle goods storage area will have a plurality of spaced floors at different heights, and/or a floor which is selectively movable in height, and the platform is moveable so as to allow goods to be moved to and from each of said floors of the vehicle goods storage area and also to the height of the loading bay and/or warehouse. In one embodiment, the frame includes at least one gangway formed to one side of the platform so as to allow operators to move and access the platform to arrange or move goods to and from the same.

In one embodiment, the goods are held in cages which can be wheeled to and from the platform and said platform typically includes fixed or moveable portions which can form ramps to provide a continuous movement path between the platform and the particular floor of the goods storage area.

In one embodiment the modular unit with the drive means is provided with insulating means, typically said means surrounding the drive means so as to reduce the operating noise created by the drive means in use.

In a yet further aspect of the invention there is provided a method of forming lifting means apparatus for use to allow goods to be transported to and from a first goods storage area in the form of a vehicle transported storage area and a second goods storage area, a gap being provided between the first and second goods storage areas, said gap receiving the lifting apparatus which includes a body modular unit having a platform movable to different heights under the influence of drive means provided in a further modular unit, and wherein said method comprises the steps of forming the body modular unit under factory conditions, forming the drive means modular unit under factory conditions, transporting the respective modular units to the location of use and installing the same such that the lifting apparatus is provided at the location of use.

In one embodiment the body modular unit and drive means modular unit are joined together at the time of installation at the location of use. Alternatively they are joined together prior to transport to the location of use.

In a yet further aspect of the invention, there is provided lifting apparatus for use in conjunction with a first storage area and a spaced, second storage area with the lifting apparatus provided to fill at least part of the space between the respective storage areas, said apparatus including a platform which is vertically movable and at least one side of said platform adjacent one of the storage areas, a floor, wherein the height of said floor with respect to the base of the apparatus can be selected so as to provide the floor at a particular height, within a range of heights.

In one embodiment, the particular height which is selected, is such to match with the level of the goods storage area adjacent to which the floor is positioned.

Typically, the particular storage area, is a warehouse and the level is the level of the loading bay leading into the warehouse.

Typically the floor of the lifting apparatus is positioned to a height which matches the height of the loading bay so as to provide a continuous substantially flat surface between the platform and the loading bay.

The provision of the floor to be selectively positionable within a height range, means that the lifting apparatus can be range taking in respect of the particular loading bay adjacent to which the same is to be positioned. This means that the height can be adjusted to suit a specific loading bay without any alteration to the remainder of the lifting apparatus being required.

In one embodiment the said floor is supported by a plurality of members, and the position of said floor along said members can be selected so as to position the floor at the required height. Typically, once the particular height of the floor has been selected, the same can be locked in position for subsequent use.

Another benefit of the provision of the selectively moveable floor is that it allows the apparatus to be moved from a first location of use at which, for example, the floor is provided at a first height, to a second location of use at which the said floor may be required to be at a different height to suit a different height of loading bay at the said second location. This means that the apparatus can be moved from one to another location and can be adapted relatively quickly to suit the specific requirements of the further location. It also means that the apparatus can be moved and adjusted on site and therefore avoids the need for the same to be taken offsite for alterations and therefore greatly improves the speed of movement and the efficiency and economy of the same.

In a yet further aspect of the invention, there is provided a goods storage and moving facility, said facility including a storage area with a first loading and unloading location adjacent to which there is provided lifting apparatus having a platform which is vertically moveable to allow the loading of goods from and onto a vehicle storage area and wherein there is provided at least one further loading and unloading location at which there is provided a second form of apparatus so as to provide a bridge between the floor of the storage area and a floor of a storage area of a vehicle.

In one embodiment the said second form of apparatus has a platform which is angularly adjustable In one embodiment, the lifting apparatus with the vertically moveable platform, is provided to facilitate the loading and unloading of goods from a vehicle storage area which has first and second floor levels. In one embodiment, the first and second floor levels are vertically spaced and fixed in position.

In one embodiment, the bridging apparatus is provided to allow the loading and unloading of goods to and/or from a storage area with a single floor level.

Typically, the vehicle storage area with which the lifting apparatus is to be used, is significantly larger than the storage area of the vehicle to be used with the bridging apparatus.

In one embodiment of the invention, the facility is used for receiving goods of a particular type or storage requirement i.e. ambient goods or dry goods or frozen goods which are provided in single loads on the vehicles having the two levels of storage area. The received goods are then split into smaller quantities and combined with quantities of other types of goods within the storage facility so as to form a combined delivery which is required to be delivered in the smaller vehicle storage area to a retail unit.

Typically the facility and apparatus herein described, is particularly useful in allowing deliveries by relatively large scale retail companies, to their smaller retail units at which space is typically limited and which therefore cannot easily accommodate or indeed cannot accommodate at all, the larger type of vehicle storage area and, even if they can, would require conventionally, a number of deliveries of the different types of goods from different vehicles in the given day.

Specific embodiments of the invention are now described with reference to the accompanying drawings wherein;

FIGS. 1a-g illustrate an embodiment of apparatus in accordance with the first aspect of the invention in use;

FIGS. 2a-c illustrate perspective views of the apparatus of FIGS. 1a-e in different positions of use;

FIGS. 3a-d illustrate further views of the apparatus of FIGS. 1a-e and 2a-c;

Figure 1C:
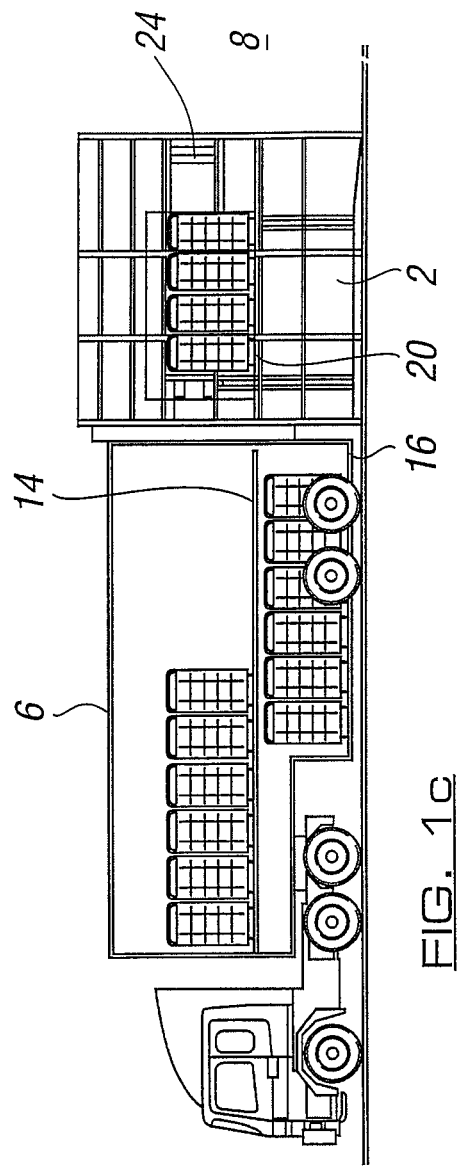
Figure 1D:
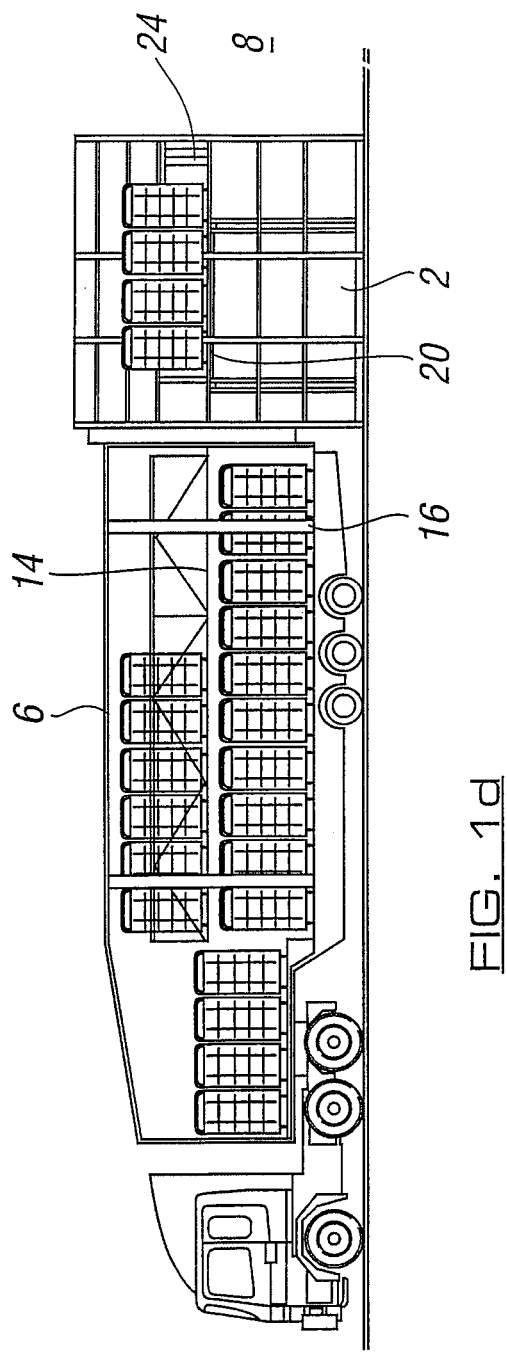
Figure 1G:
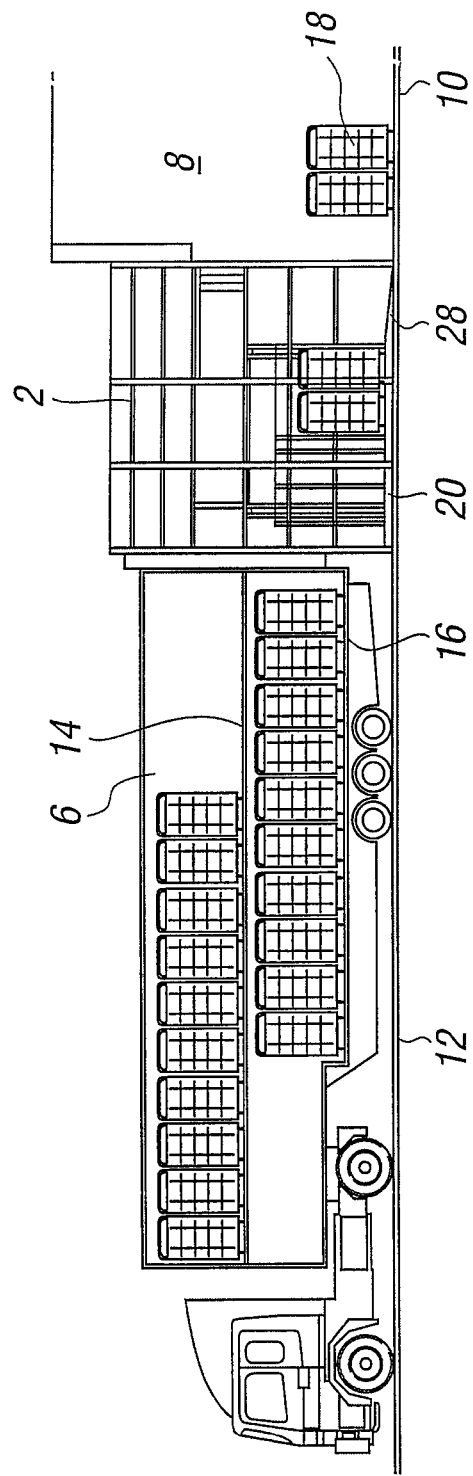

Referring firstly to FIGS. 1a-g, there is illustrated lifting apparatus 2 in accordance with the first aspect of the invention. The apparatus is shown in position in a space 4 defined between a first goods storage area 6 in the form of a vehicle trailer and a second goods storage area 8 in the form of a warehouse. The floor 10 of the warehouse 8 is at substantially the same level as the ground or support surface 12 on which the vehicle trailer is placed.

FIGS. 1a-g illustrate different forms of the first goods storage area 6, with the storage area of FIGS. 1a-d and 1f-g, each having two floors 14 and 16 which are vertically spaced apart and in FIG. 1e, the storage area is provided with a single floor 16. In this case, the goods are located in cages 18 which can be rolled into and from the first goods storage area 6 and transferred onto and from a platform 20 of the lifting apparatus 2. It will be appreciated that the platform 20 can be raised and lowered in the vertical plane via guide means which are mounted on the pillars 22 and which are acted upon by drive means 24 connected thereto. Typically the drive means is a single ram, the movement of which causes the movement of the guide means which are connected, at their opposing end to the platform 20.

As is shown in FIG. 1b, the platform can be moved to a fully lowered position in which the top surface of the same is at the same height as the highest point 26 of the gap portion 28 in the form of a ramp. The gap portion of the apparatus 2 lies between the end 30 of the platform and the start 32 of the floor 10 of the second goods storage area 8. This therefore ensures that the cages can be rolled onto and from the platform at the lowered position onto the gap portion 28 and hence into and from the goods storage 8.

Furthermore, as the platform 20 can be raised, so the same can be raised to the height of the floor or floors 14, 16 of the first goods storage area 6 and moved onto or from the same.

Conventionally, if the movement of the goods cages or trolleys was to be achieved between the first and second goods storage areas as shown, the support surface 12 would not be provided in a horizontal form as shown but instead, would need to be provided as a ramp 13 dug into the ground as shown in broken lines in FIG. 1b with the lowest point of the ramp being at the location of the floor 10 of the second goods storage area 8 so that the level of the floor 16 of the first goods storage area would be at the same level as the floor 10 of the second goods storage area 8 so as to allow the goods to be moved directly to and from that storage location into the second storage location.

It will therefore be appreciated that by providing the lifting apparatus in accordance with the invention intermediate the first and second goods storage areas, there is no longer any need to excavate into the ground to form a ramp 13 and hence significant time savings and costs savings can be achieved.

FIGS. 2a-c and 3a-d, illustrate the apparatus 2 in more detail and show the platform 20 in various height positions. Also shown is a walkway 32 which is formed at one side of the platform and which is separated from the platform by barrier 34 so as to ensure that the walkway is always available for personnel to walk along the same and move between the ends 36 and 38 of the platform.

Figure 2A:
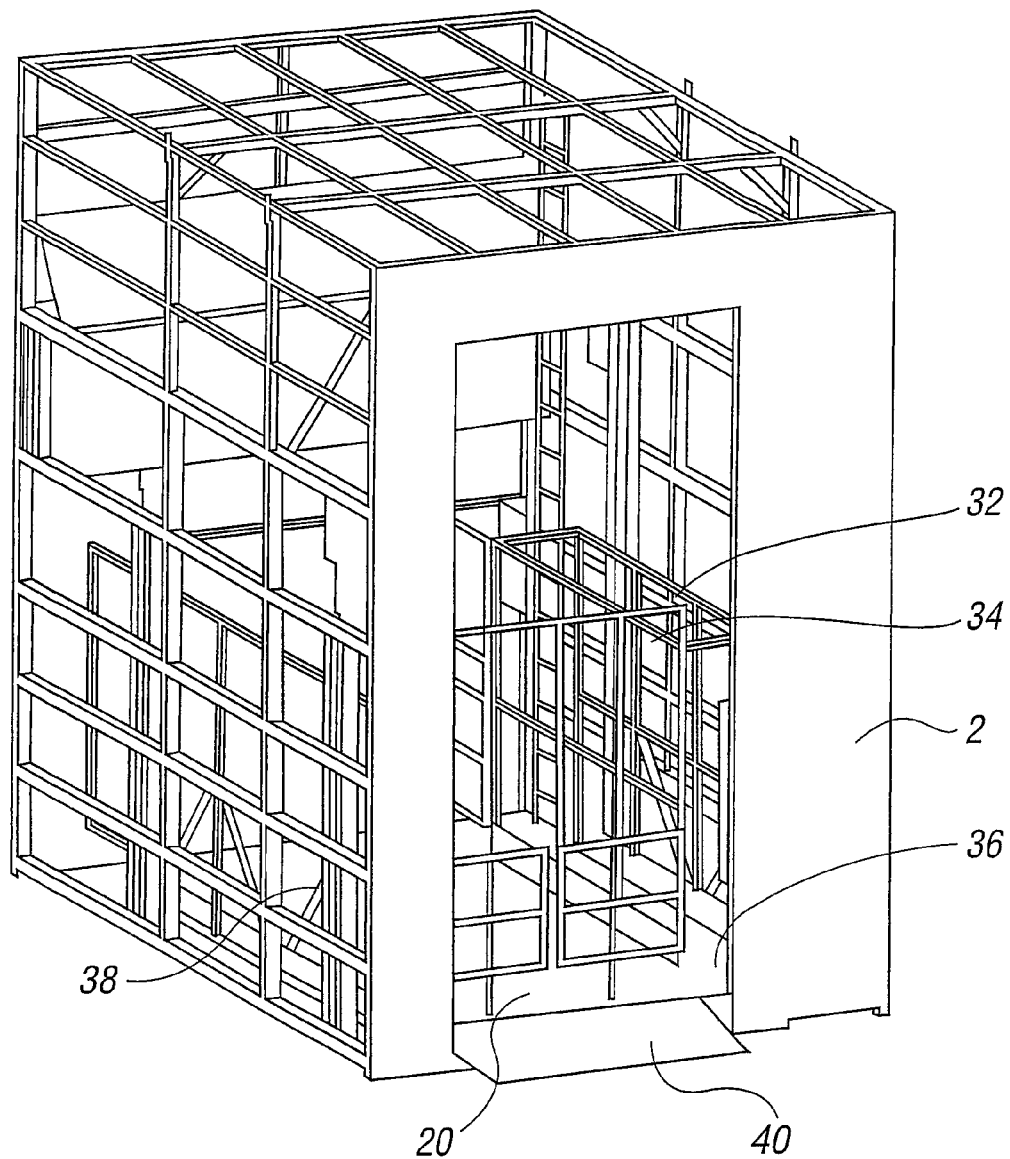
Figure 2B:
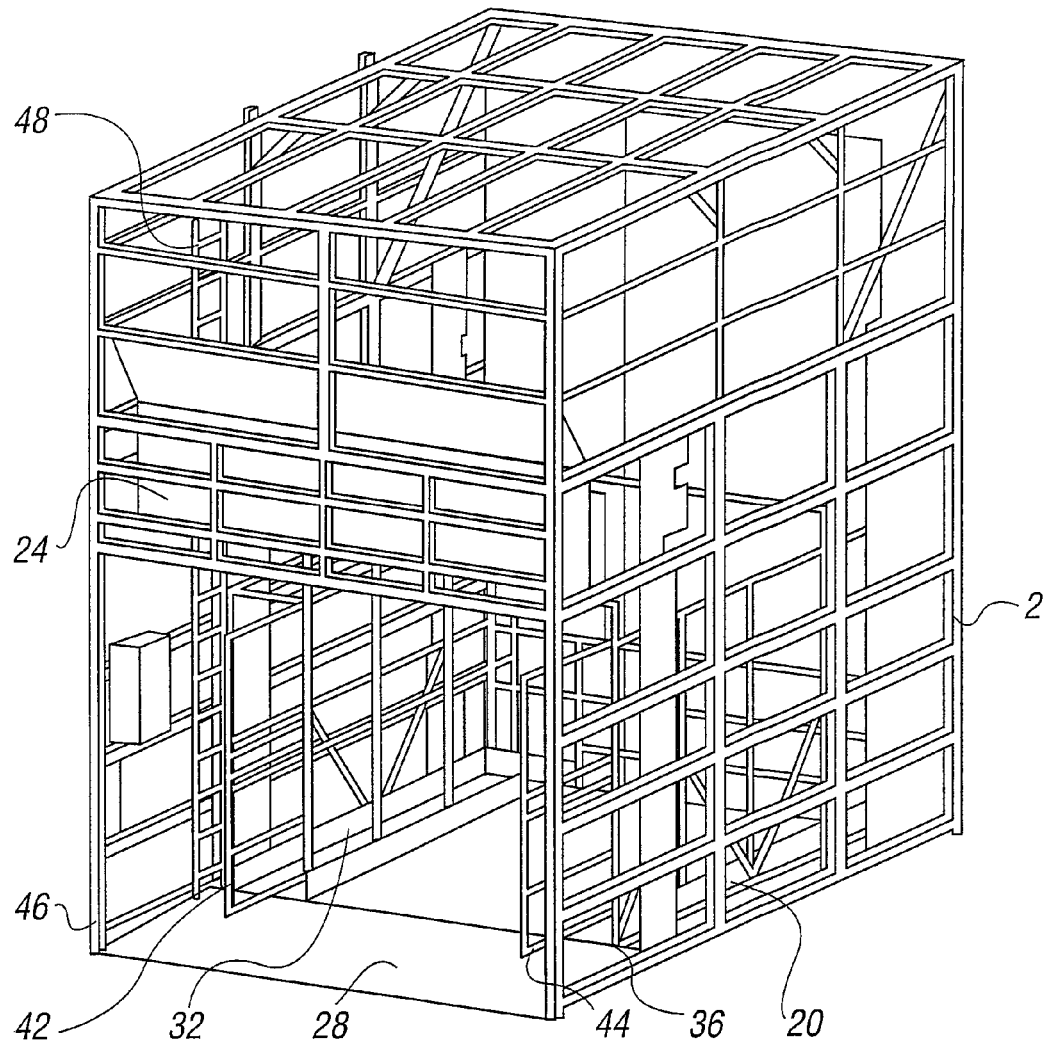
Figure 2C:
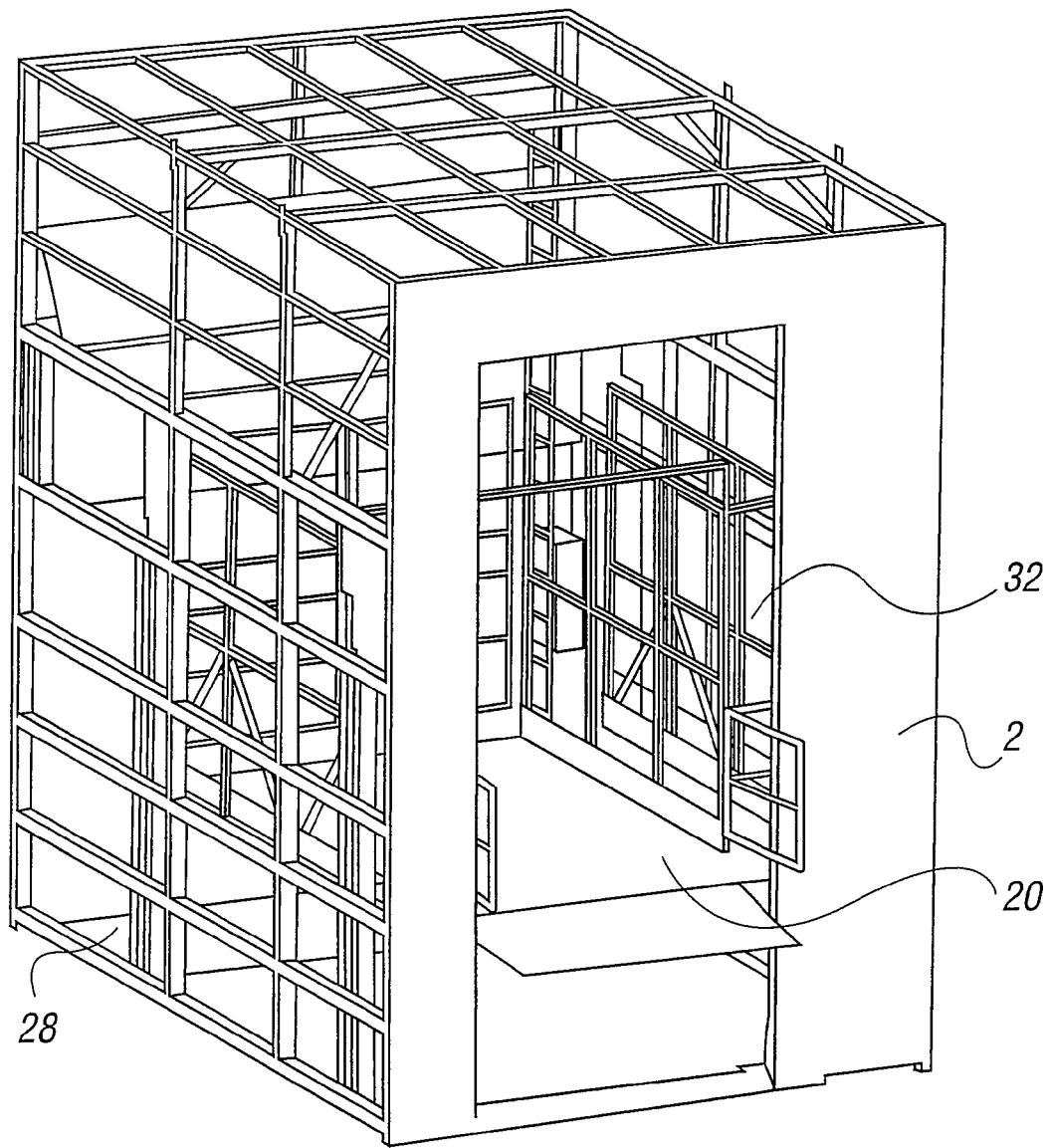
Figure 3A:
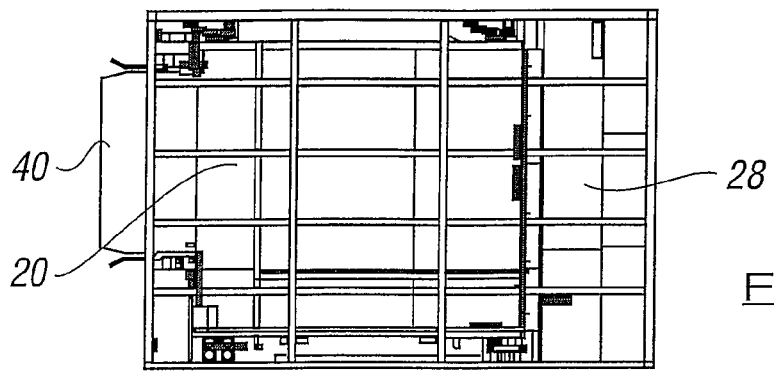
Figure 3B:
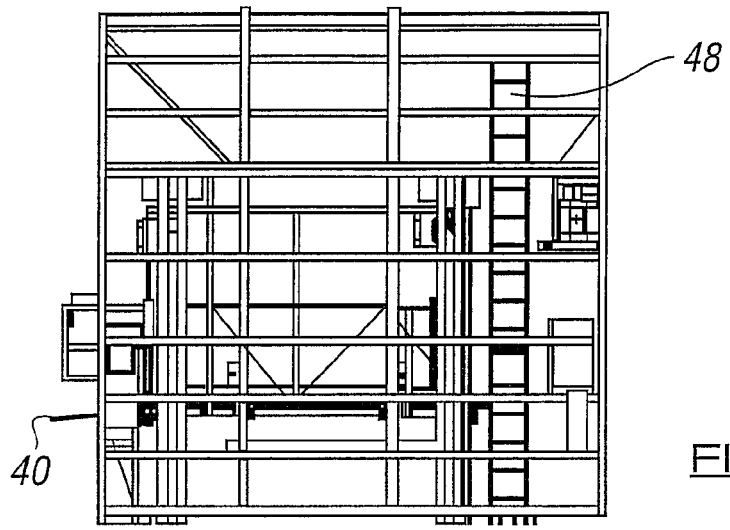
Figure 3C:
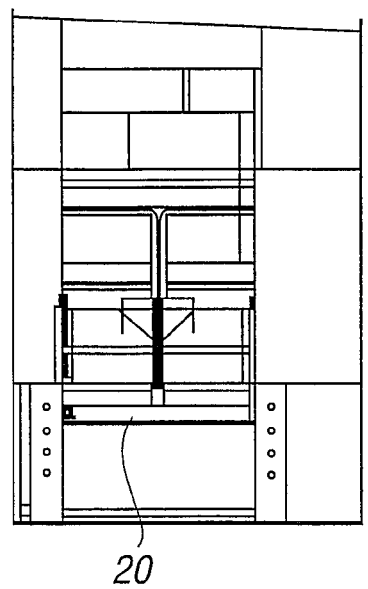
Figure 3D:
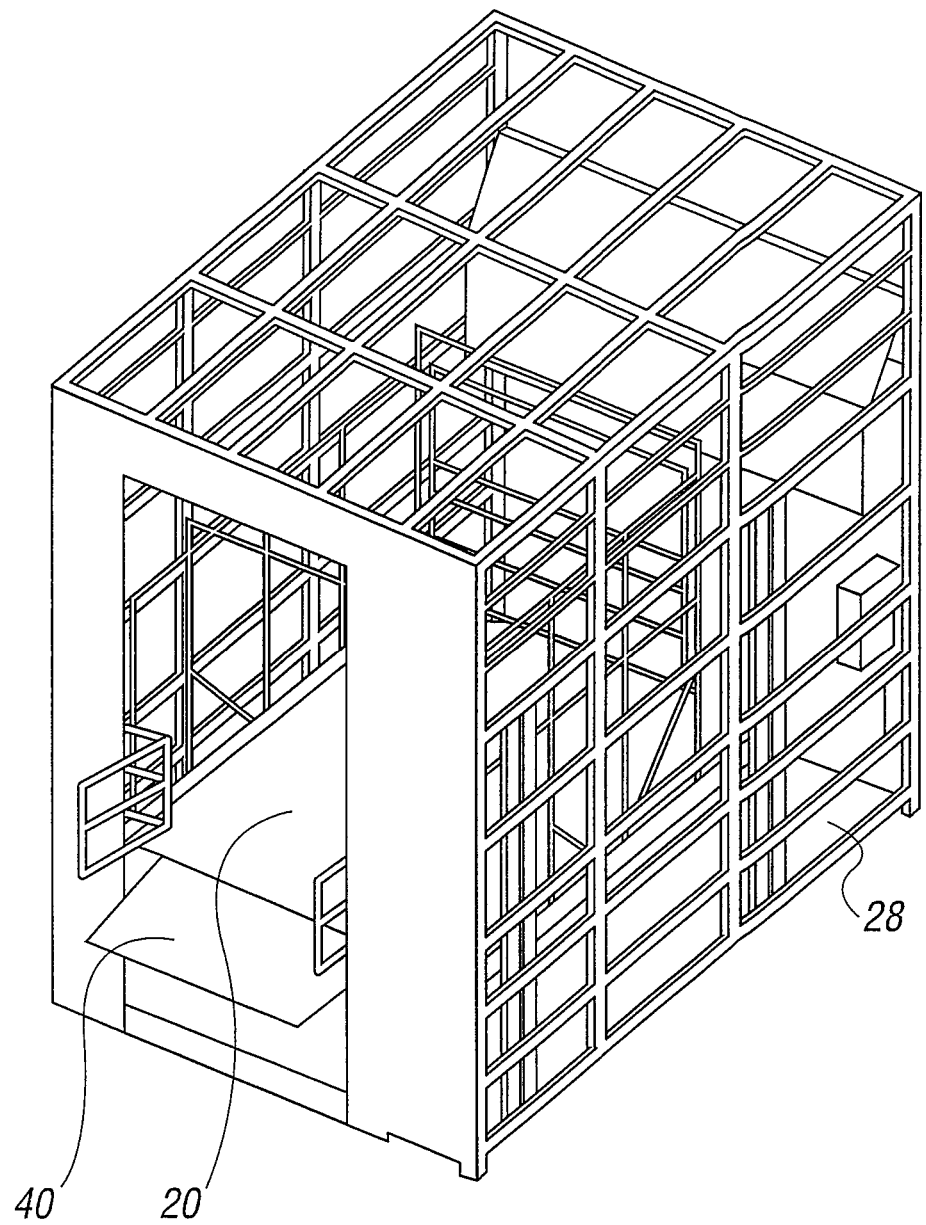

The end 38 of the platform is provided to be adjacent the gap portion ramp 28 and the opposing platform end 36 is provided with a bridge portion 40 which, preferably, can be moved into the opening into the first goods storage area and can then be extended widthways, typically by a fanned movement of planar portions which form the bridge so that the side edges of the bridge portion extend to the full width of the first goods storage area, which is typically wider than the opening into the goods storage area. This ensures that goods such as cages, can be dispersed to the sides of the goods storage area from the bridging portion. Also provided at the end 36 of the platform, are doors 42, 44 which are required to be closed when the platform 20 is moved to a raised level as shown in FIG. 2c but can be opened when the platform is at its lowest level as shown in FIG. 2b. Typically, the frame of the lifting apparatus is provided with at least one fixed member which, when the platform is raised, is positioned such that when an effort is made to open the doors contacts with the doors so as to prevent the same from being opened.

The drive means 24 in the form of a hydraulic ram, is shown in FIG. 2b as being located at a raised height on the frame and in the gap between the end 36 of the platform and the outer edge 46 of the frame of the lifting apparatus at that end. The provision of the drive means at a raised height, means that the same does not impede or impact on access to and from the gap portion ramp 28 from the platform 20 as the platform only accesses that ramp when the same is at its lowest position and the drive means 24 raised height is sufficient to ensure that any goods on the platform will not contact with the drive means.

A ladder 48 is also provided as part of the frame and preferably is provided intermediate the location of the drive means 24 and the end 36 of the platform. The ladder is provided to a sufficient height to ensure that even when the platform is at its highest level, then if the same should fail or be required to be held at that position for cleaning of the apparatus or any other purpose, personnel will still be able to leave the platform 20 and leave the apparatus 20 altogether via the ladder.

Figure 4:
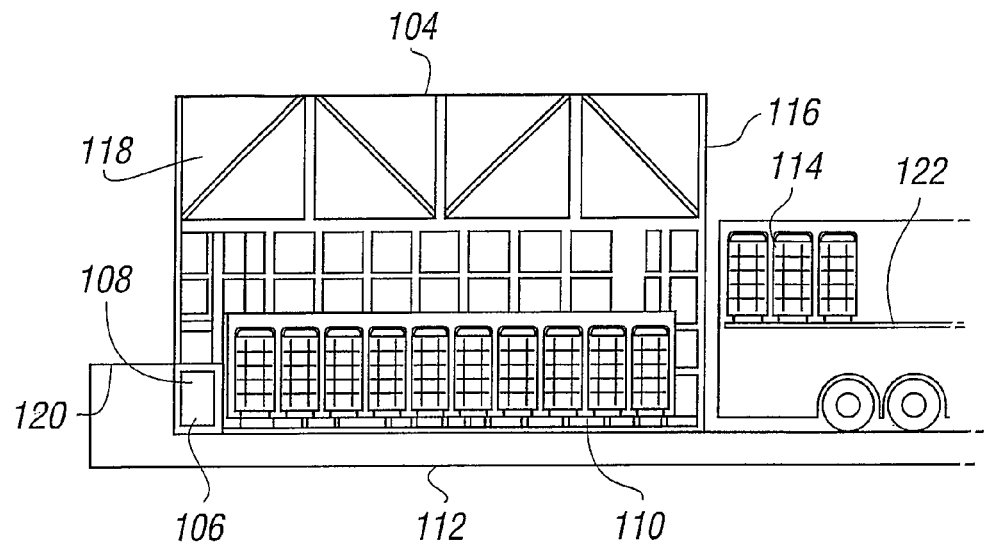
FIG. 4 illustrates apparatus in accordance with a further aspect of the invention.

Referring now to FIG. 4, there is illustrated apparatus 102 in accordance with a further embodiment of the invention. The apparatus in this embodiment, comprises a body module unit 104 and a drive means unit 106.

As shown, the drive means unit 106, is received within a recessed portion 108 of the body module unit 104. It should be appreciated that the external dimensions of the drive means unit 106, can be of a standard size but, within the unit, there may be provided differing configurations of drive means such as for example a single hydraulic ram, double hydraulic rams and so on. The particular drive means employed within the modular unit 106 may be selected to suit the particular use and size of the body unit to which the same is to be fitted. Typically, the drive means unit can also be insulated to reduce the generation of noise from the same. The drive means unit and the body unit are provided with matching mechanical engagement means to allow the two units to be relatively quickly and easily connected together.

Matching connections means can be provided between the drive means of the drive means unit and the body unit so as to ensure the drive force created by the drive means, can be transferred to the body unit such for example, to move the platform 20 provided as an integral part of the body unit. By providing the drive means unit and body unit as separate modular units, so it is possible for the same to be manufactured under factory conditions at different factory locations. This, in turn, means that the units can be manufactured at the most appropriate location, i.e. where the necessary expertise is most available such that for example, the fabrication of the frame and platform of the body unit, may be provided at a first factory and, the manufacture of the drive means, and hydraulic circuitry required for the same, can be provided at a second factory location as the same are manufactured as difference modular units. The modular units can then be transported, separately, to the location of use, at which location the same are joined and connected together as required. It is found that this provides significant advantages both to the end user and to the manufacturers of the units in terms of expertise which is required to be located at each factory and the manufacturing time.

Typically, the apparatus, when provided at the location of use, is provided to bridge a gap 112 between a first goods storage area 114 which can be a vehicle trailer, with one of a plurality of vehicle trailers being selectively positioned as shown to one side 16 of the apparatus when formed. To the opposing side 118 of the apparatus, there is provided a second good storage area in the form of a loading bay of a warehouse 120. Thus, from time to time, vehicle trailers can be backed up to the apparatus and goods loaded to and from the same via the platform provided on the body unit of the apparatus. The platform can be moved vertically by the drive means which are provided in the drive means unit 106 so as to bring the platform 110 to the required height of the floor or floors 122 of the first storage area to allow goods to be transferred to and from the platform 110 and then moved, if required, to the height of the loading bay 120 of the second goods storage area again to allow the goods to be moved to and from the same.

If required, further modular units can be used in selected combinations so as to provide lifting apparatus to suit the particular location of use and the requirements for movement of goods at said location. In whichever embodiment, the provision of the drive means unit has a separate modular unit of that of the body unit and any other units which may be required means that the manufacturer of the respected units is improved and, furthermore, the installation of the respective units at the location of use can be easily achieved.

Figure 5:
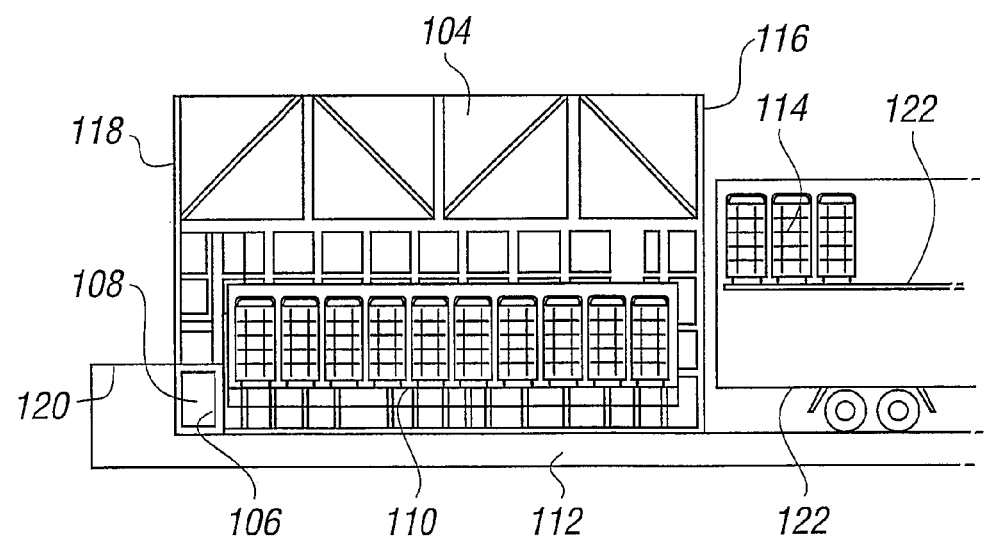
FIG. 5 illustrates the apparatus of FIG. 4 in position for use in movement of goods.
Figure 6:
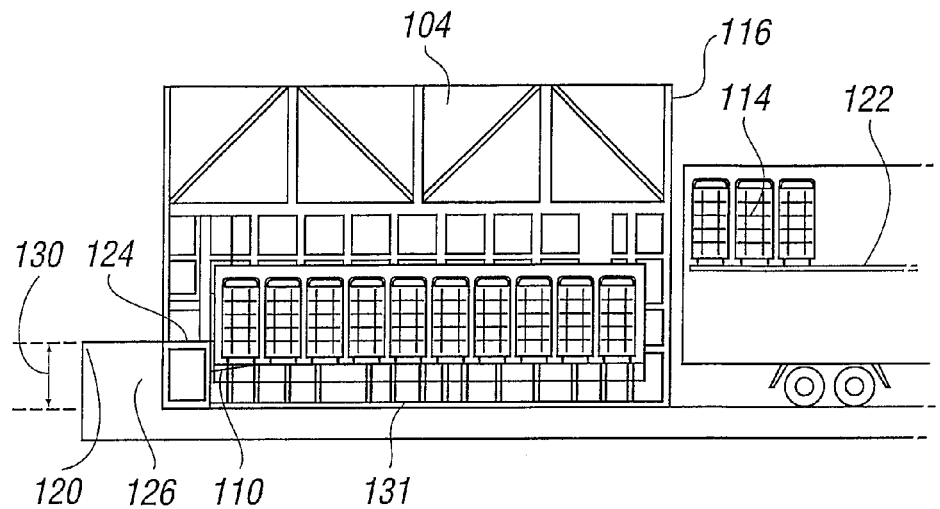
FIG. 6 illustrates an embodiment of a further aspect of the invention.

FIG. 6 illustrates the apparatus shown in FIGS. 4 and 5 and also illustrates a further embodiment of the invention. At the position of the apparatus adjacent to the storage area in the form of warehouse 120, the apparatus includes a floor 124 which act to form the interface between the loading bay 126 of the warehouse 120 and the platform 110 of the apparatus. In the figure as shown, the loading bay has a height 130 from support surface or floor 131 and preferably, in use, the floor 124 of the apparatus should be provided at the same height as the loading bay so as to provide a continuous surface across which trolleys or goods can be moved.

When the platform 110 is provided at the same height as the floor 124 then the goods can easily be rolled or moved directly from the loading bay across the floor and onto the platform.

The floor 124 in accordance with this embodiment of the invention, is provided on support means (not shown) which allow the selective adjustment of the height of the floor with regard to the goods storage area loading bay 126 and typically, once the particular height has been selected to match the floor 124 height with the height of the loading bay 126, the position of the floor can be locked for subsequent use.

It should be appreciated that typically the loading bays in different parts of the same facility or in different facilities, can be provided at different heights and therefore in accordance with the invention, by allowing the floor 124 to be selectively adjustable in terms of its height, so, at the time of installation the floor height can be adjusted to match the height 130 of the particular loading bay with regard to which the apparatus needs to be used. It also means that if the apparatus is moved from a particular location to be used at another part of the facility or indeed at a different facility, then the floor height can be adjusted to suit the height of the new loading bay adjacent to which the same is to be used, without, as is conventionally the case, significant fabrication work being performed which typically, would require the apparatus to be returned to a factory for the removal of the old floor and installation of a new one at the new height.

Figure 7:
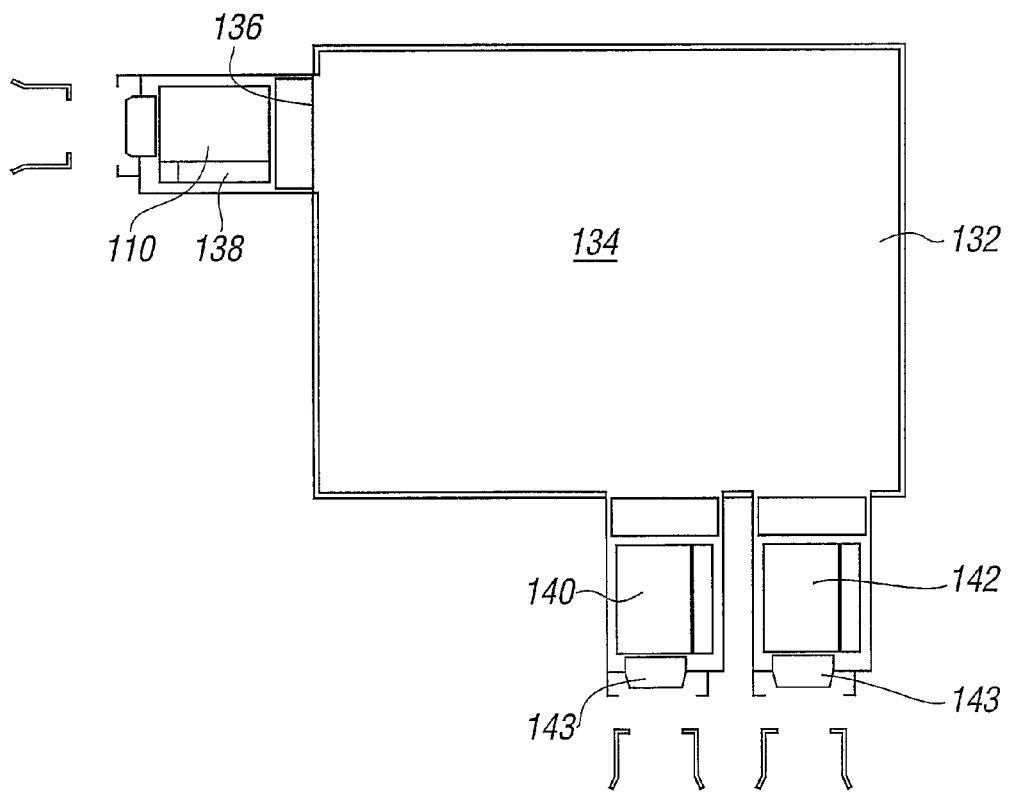
FIG. 7 illustrates an embodiment of a further aspect of the invention

Referring now to FIG. 7 there is illustrated a yet further aspect of the invention in which there is provided a storage facility 132. The storage facility is provided of a size which is smaller than a major hub for a retail outlet but is of sufficient size so as to allow goods which are required to be delivered to a number of local retail units and, typically retail units of a relatively small size and/or which have a relatively confined loading and unloading space available, to be stored. The facility includes a storage area 134 within which goods can be moved about and grouped and a first loading and unloading location 136 is provided at which there is provided lifting apparatus 138 of the type described in relation to FIGS. 4-6 and including a platform 110 which is vertically movable. Also provided, is at least one further goods loading and unloading location and, in this case, two of the same are provided 140, 142. At this location, bridging apparatus 143 is provided which comprises a platform which is angularly adjustable so as to form a bridge between the loading bay of the facility and the floor of a vehicle storage area so as to allow the goods to be transferred between the same.

In accordance with the invention, the lifting apparatus 138 is used to unload goods from relatively large double deck vehicle storage areas, with these storage areas typically containing goods of a single type i.e. one vehicle has all goods which are required to be held in frozen or chilled conditions, or dry goods or clothing or the like. Typically, the loads of these vehicles are too great for all to be delivered to one small retail unit but, due to the lack of space conventionally these large vehicle storage areas have to be used to deliver the goods to each retail unit which means that each retail unit receives deliveries from a number of these vehicles to allow the goods of different types to be delivered each day. This is difficult to achieve, uneconomical and can be detrimental to the environment surrounding the retail unit.

In accordance with this embodiment of the invention, the provision of the facility as herein described, means that the goods vehicles can be unloaded via the lifting apparatus 138 and the goods from the various vehicles can be combined within the facility into combined loads each of which is to be delivered to a specific local retail unit. The combined load can then be loaded onto a smaller vehicle via the bridging apparatus and then delivered by the smaller vehicle to the specific retail unit. This therefore means that only one delivery is required for all goods as opposed to three or four deliveries. Also, as the vehicle used is smaller, access is more easily achieved and hence the whole goods movement process is significantly improved.

The invention claimed is:

1. Lifting apparatus for use to move goods between first and second, spaced apart, goods storage areas, said apparatus provided to bridge a space between said first and second goods storage areas, said lifting apparatus comprising:
a frame,
a platform mounted on the frame to allow goods thereon to be moved, if required, to different height levels, the platform movable from a first height level that corresponds to a storage floor of a first goods storage area to a second height level that corresponds to a storage floor of the second goods storage area, the second height level, differing from the first height level;
a floor portion positioned entirely within the frame which extends between a gap between one end of the platform and an outer edge of the frame adjacent the storage floor of the second goods storage area; and
wherein a height of said floor portion is selectively adjustable at a time of installation of the lifting apparatus such that the floor portion, at least adjacent the second goods storage area, is at a height substantially in line with the floor of the second goods storage area and a position of the floor portion is then maintained at that position for subsequent use of the lifting apparatus in said fixed position and wherein a drive means unit is provided to allow the powered movement of the platform between said first and second height levels, and the drive means unit is located on the frame at a location which is, greater than the height of the said Storage floor of the said second goods storage area and which is above the gap between the said end of the platform and the outer edge of the frame.

2. Lifting apparatus according to claim 1 wherein the height of the floor portion is greatest adjacent to the end of the platform.

3. Lifting apparatus according to claim 1 wherein a highest point of said floor portion matches and marries with the height of the top surface of the platform in at least one position of the platform.

4. Lifting apparatus according to claim 3 wherein said at least one position of the platform is that in which it is fully lowered.

5. Lifting apparatus according to claim 1 wherein the frame includes at least one ladder which depends at least partially along the height of the frame so as to allow access to and from the platform even when the platform is at a raised height.

6. Lifting apparatus according to claim 5 wherein the drive means is located at or adjacent to the end of the apparatus frame and the ladder is located intermediate the drive means and the end of the platform.

7. Lifting apparatus according to claim 1 wherein the apparatus is provided as a body module including a drive means, said platform and gap portion, and a roof module which are delivered on site and then assembled together to form the apparatus.

8. Lifting apparatus according to claim 1 further comprising: a walkway separated from a remainder of the platform so as to allow personnel on the platform to walk from one end of the platform to the other along said walkway.

9. Lifting apparatus according to claim 1 wherein the platform includes a bridge portion, said bridge portion provided to be extendable into an open end of the first goods storage area so as to bridge any gap between the adjacent edge of the platform and the end of the floor or floors of the goods storage area, said bridge portion provided to fan outwardly once the bridge portion has been introduced into the first goods storage area so as to extend across a width of an interior of the goods storage area.

10. Lifting apparatus according to claim 1 wherein the lifting apparatus is provided to allow movement of cages or trolleys on which the goods are located.

11. Apparatus according to claim 1 wherein the second goods storage area is a warehouse and the said second height level is a level of loading bay leading into the warehouse, the floor portion is positioned to a height which matches the height of the loading hay of the second storage area so as to provide a substantially continuous flat surface between the platform and the loading bay.

12. Apparatus according to claim 11 wherein the floor portion is supported in position by a plurality of members.

* * * * *